UNITED STATES PATENT OFFICE.

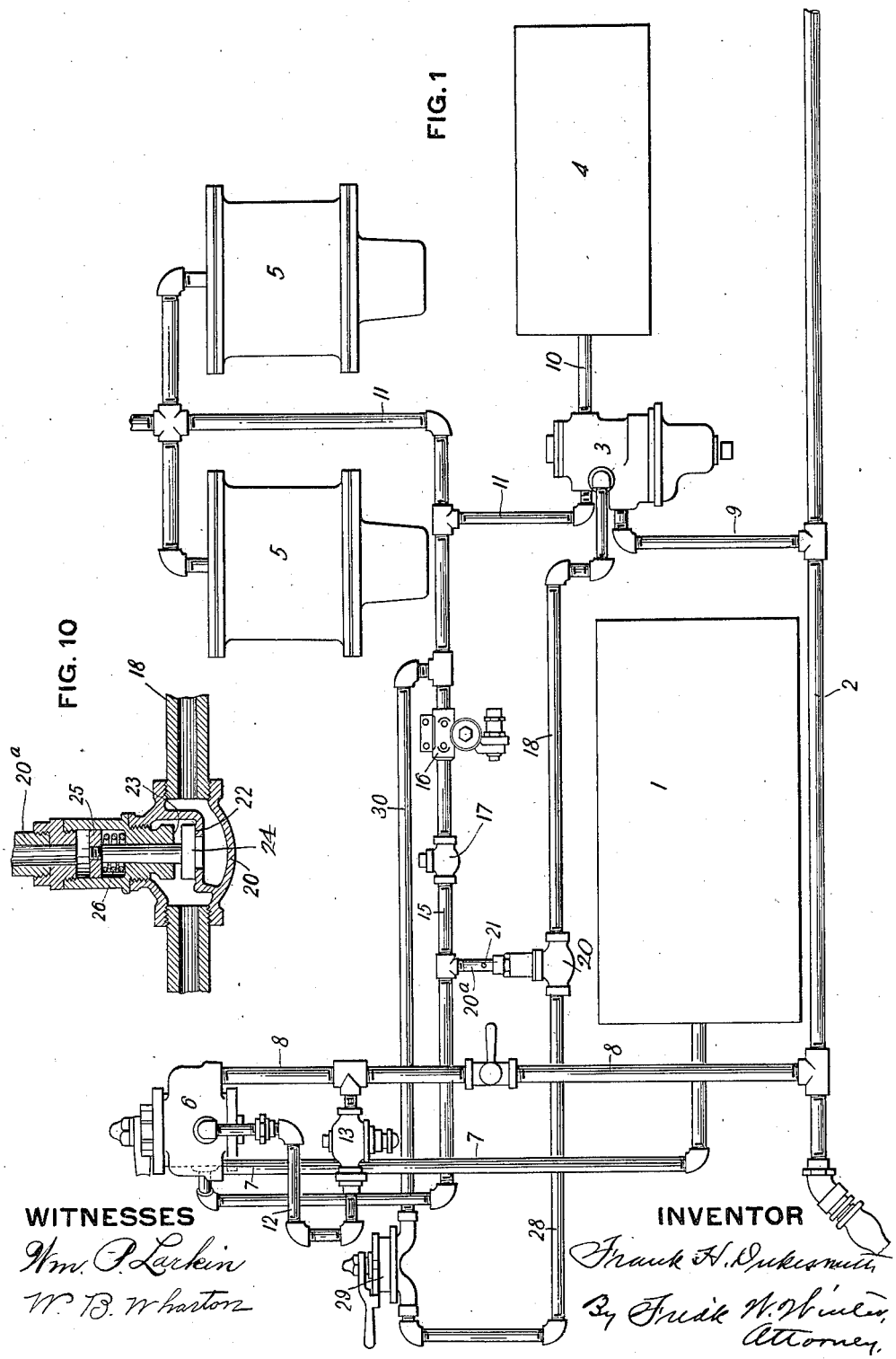

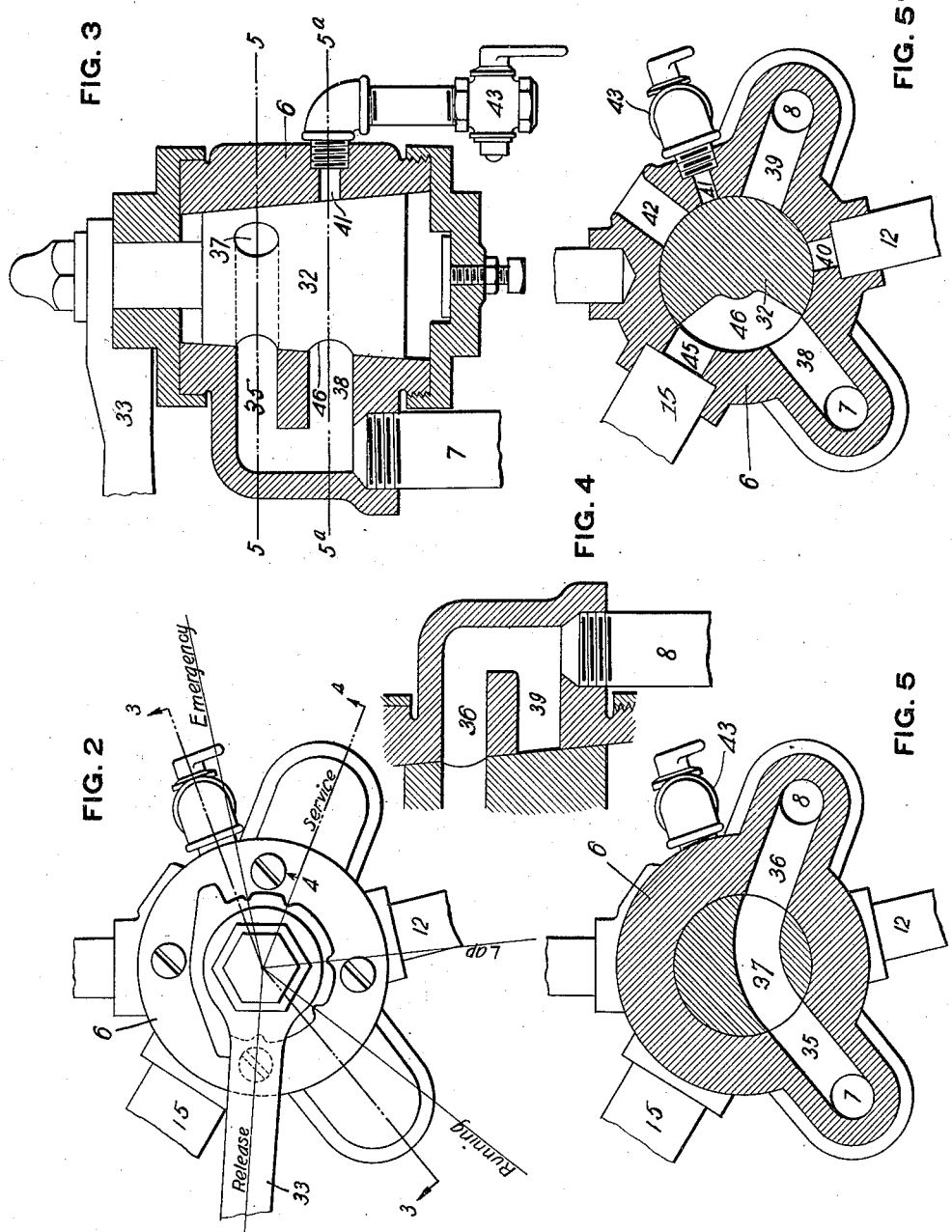

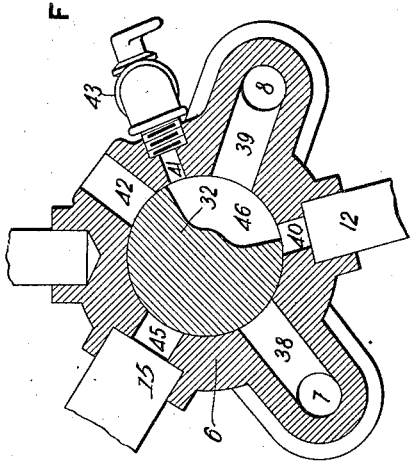
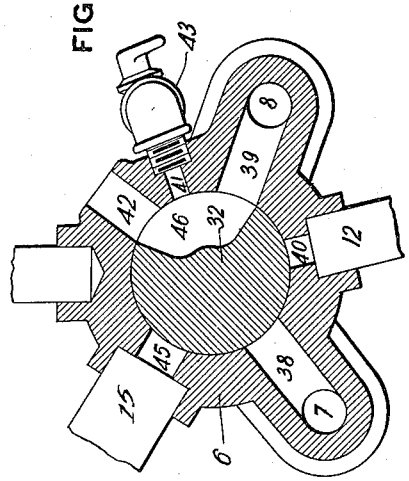
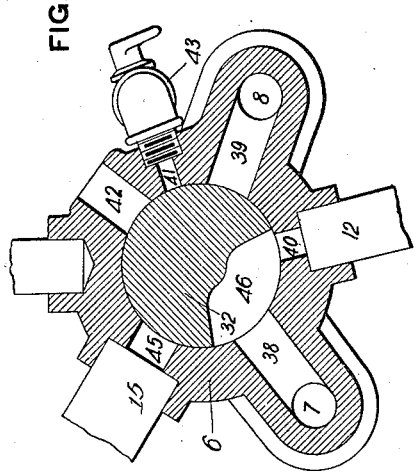
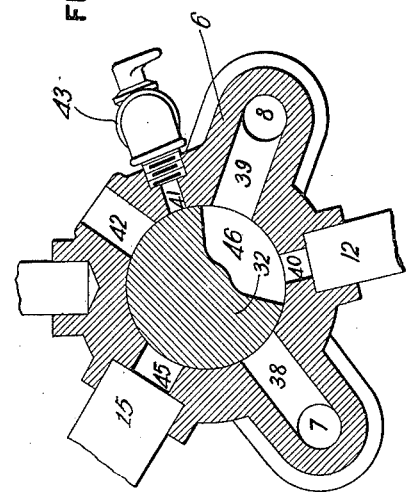

FRANK H. DUKESMITH, OF MEADVILLE, PENNSYLVANIA, ASSIGNOR TO THOMAS C. VAN HORNE, OF PITTSBURGH, PENNSYLVANIA.

AIR-BRAKE SYSTEM.

1,092,812. Specification of Letters Patent. Patented Apr. 7, 1914.

Application filed November 16, 1912. Serial No. 731,825.

*To all whom it may concern:*

Be it known that I, FRANK H. DUKESMITH, a resident of Meadville, in the county of Crawford and State of Pennsylvania, have invented a new and useful Improvement in Air-Brake Systems, (Case 3,) of which the following is a specification.

This invention relates to automatic air brake systems, and its object is to provide an engineer's valve and piping arrangement whereby the engine brakes may be held while releasing the train brakes so as to prevent pulling the train in two in releasing, or to hold the engine brakes while recharging the train auxiliary reservoirs, and also whereby when necessary the engine brakes can be set without setting the train brakes.

A further object is to provide, in addition to an engineer's valve such as described, an auxiliary control valve by means of which the engine brakes may be released or held independently of the train brakes.

In all automatic air brake systems there is in the cab of the locomotive a valve, technically known as the engineer's brake valve, by means of which the brakes can be applied either for service or emergency applications, or can be released. All such valves have five different positions, one being running position in which the main reservoir is connected to the train pipe through the governor, a second being brake release position in which the main reservoir is connected directly to the train pipe, a third being lap position in which all of the ports are lapped or closed, and the fourth and fifth being respectively service and emergency application positions, in both of which the train pipe is connected to the atmosphere. With all such engineers' brake valves, all of the brakes, both on the engine and on the cars are released and applied simultaneously, or at least as nearly simultaneously as the venting or charging of a long train pipe permits. In any event, it is not possible by means of such valves as at present constructed to control the engine brakes independently of the train brakes.

One object of my invention is to provide an engineer's valve by means of which the engineer can control the engine and train brakes independently.

In releasing the brakes by means of the ordinary engineer's valve, the pressure travels from the forward end of the train toward the rear end and experience has shown that the brakes instead of being operated simultaneously for the full length of the train are released serially or successively from the engine toward the rear of the train. The consequence is that the engine, being first released, shoots forward while the cars, or at least the rear ones, are still held by their brakes. This frequently results in pulling the train apart, besides leading to other difficulties.

Another object of my invention is to provide an engineer's valve whereby when brought to release position, the engine brakes may be held and not released until the valve is brought to running position, thereby holding the engine until the brakes for the entire train are released and preventing the pulling apart of the train, as stated.

In descending long grades it is necessary to apply the brakes repeatedly, due to the leakage of the brake cylinder packings. As a consequence, the air in the auxiliary reservoirs becomes exhausted so that after a time it is no longer possible to apply the brakes with sufficient pressure to hold the train. It then becomes necessary to recharge the auxiliary reservoirs, but this with all existing forms of triple valves necessitates releasing all of the brakes so that before the auxiliary reservoirs can be charged the train is likely to get beyond control. Various schemes have been provided for holding the engine brakes while recharging the train auxiliary reservoirs, but generally such prior arrangements have necessitated additional valves.

A further object of my invention is to provide an engineer's brake valve whereby this desirable result can be obtained. This result is obtained by the engineer's valve before described, namely, having it so arranged that when brought to full release position, in which the auxiliary reservoirs of the train can be charged, it holds the engine brakes.

The invention, therefore, consists in an engineer's valve having the ordinary positions of service and emergency applications, lap, running and brake release position, and being also provided with ports or passages and being so connected to the engine brake cylinders and triple valve that when brought to full release position the exhaust from the triple valve is closed and air admitted from the main reservoir or other suitable source directly into the engine brake cylinders. This arrangement enables the engine brakes to be set without setting the train brakes, by merely coming from running position to full release position.

In the accompanying drawings Figure 1 is a diagrammatic view showing an engine equipment according to my invention; Fig. 2 is a top or plan view of the engineer's valve; Fig. 3 is a vertical section therethrough on the line 3—3, Fig. 2; Fig. 4 is a similar detail section on line 4—4, Fig. 2; Figs. 5 and 5ª show sections through the valve when in full release position, taken respectively on the lines 5—5 and 5ª—5ª, Fig. 3; Figs. 6, 7, 8 and 9 are sectional views of the valve taken on the line 5ª—5ª, Fig. 3, showing the same respectively in running, lap, service and emergency positions; and Fig. 10 is a vertical section showing the valve for closing the exhaust port of the engine triple valve.

My system comprises the usual main reservoir 1, train pipe 2, engine triple valve 3, engine auxiliary reservoir 4, engine brake cylinders 5, and my special engineer's valve 6. All of these parts are connected by piping in the usual way of connecting these parts in any automatic air brake system, there being a pipe 7 connecting the main reservoir to the engineer's valve, a pipe 8 connecting the engineer's valve and train pipe, a pipe 9 connecting the train pipe and the triple valve, a pipe 10 connecting the triple valve and auxiliary reservoir, and a pipe 11 connecting the triple valve and brake cylinders. In addition to these, I provide the usual pipe 12 connecting the engineer's valve and train pipe and having therein the governing or reducing valve 13, through which the pressure medium is supplied to the train pipe in running position, as is the usual practice in automatic air brake systems.

In addition to the foregoing equipment, my invention comprises an additional pipe 15 connecting the engineer's valve to the brake cylinders 5, said pipe having therein a reducing valve 16 whereby the main reservoir pressure is cut down before reaching the brake cylinders, and also having therein a check valve 17 which is arranged to seat toward the engineer's valve so as to permit pressure to flow through the engineer's valve into the brake cylinders, but not in the reverse direction. A pipe 18 connects the triple valve exhaust port with a valve 20, which in turn is connected by pipe 20ª to the auxiliary brake cylinder pipe 15 at a point between the check valve 17 and the engineer's valve. The valve 20 serves to control the triple valve exhaust port, and between said valve 20 and the engineer's valve there is provided in the pipes a small leak port 21.

The valve 20 is shown in detail in Fig. 10, and comprises two seats 22 and 23 and a disk valve 24 coöperating with both seats, said disk valve having connected to its stem piston 25 which is acted upon by pressure coming from the engineer's valve through pipe 15 to close the valve onto seat 22, thus closing the outlet from the triple valve exhaust port. A spring 26 is provided for releasing the valve and opening this exhaust port. The upper seat 23 is provided in order to prevent the air coming from the triple valve exhaust port from leaking around the stem of the valve 20. The valve 20 has connected thereto a pipe 28 which leads to an auxiliary control valve 29, the latter also being connected by a pipe 30 to the brake cylinders. This auxiliary control valve 29 may be an ordinary three-way cock, but is shown as what is known as the Turner valve such as illustrated in patent to Charles E. Turner No. 784,526, granted March 7, 1905, said valve being provided with three ports, one connected by the pipe 28 to the triple valve exhaust port, another being connected by pipe 30 to the brake cylinders, while the third leads to the atmosphere, and the valve disk is provided with a passage whereby either of the pipes 28 or 30 may be connected to the atmosphere, or both closed. A specific description and illustration of this valve is thought not necessary as any ordinary three-way cock would answer the purpose equally as well.

The engineer's valve 6 comprises an ordinary rotary plug valve 32 working in a suitable casing and provided at its upper end with operating handle 33 which has the usual five positions of engineers' valves, these five positions being indicated in Fig. 2. The valve casing is provided with ports in two different planes vertically. In the upper plane it is provided with a port 35 connecting to the main reservoir pipe 7, and a port 36 connecting with the train pipe 8, while in this plane the plug 32 is provided with a cored-out passage or port 37 for connecting the ports 35 and 36 and putting the main reservoir into communication with the train pipe in release position of the valve. In the lower plane the valve casing is provided with a port 38 also communicating with the main reservoir pipe 7, a port 39 also communicating with the train pipe 8, a port 40 communicating with the governor pipe 12, a service exhaust port 41, and an emergency exhaust port 42. All of these ports are such as are usually found in engineers' brake valves only differently arranged on account of the different type of valve. The service exhaust port 41 is provided with a small cock or throttling valve 43 to regulate the size of exhaust opening for service applications of brakes. In addition to these usual ports my engineer's valve is provided with the port 45 communicating with the auxiliary brake cylinder pipe 15. In the plane of the ports 38, 39, 40, 41, 42 and 45, the plug 32 is provided with a single groove 46, by means of which in the different positions of the valve the several ports are connected in proper order to effect the desired functions.

The valve has five positions, as follows:

1. Running position, shown in Fig. 6. In this position the groove 46 connects the main reservoir port 38 with the governor pipe port 40 so that the train pipe is fed from the main reservoir through the governor 13 in the usual way.

2. Lap position, shown in Fig. 7, in which all ports are lapped. In this position the groove 46 connects the train pipe governor port 40 and the train pipe port 39, but obviously this causes no flow of air through the valve so the effect is the same as though these ports were closed or lapped.

3. Service application position, shown in Fig. 8. In this position the groove 46 connects the train pipe port 39 with the service exhaust port 41, thus venting the train pipe slowly and effecting the usual service application of the brakes. In this position the governor pipe 40 is also connected to the service exhaust port, but obviously the air cannot pass reversely through the governing valve.

4. Emergency position, shown in Fig. 9. In this position the groove 46 connects the train pipe port 39 with the emergency exhaust port 42 thus effecting the rapid evacuation of the train pipe and setting the brakes with emergency application as is usual.

The operation of the valve in the four positions above described is not different from the operation of the usual engineer's valve. In all of these positions the upper port 37 in the plug 32 is blanked.

5. Full release position, shown in Fig. 5. It is in this position of the valve that the new functions are effected. In this position the upper port 37 connects the main reservoir port 35 with the train pipe port 36, thus permitting the air to flow from main reservoir directly into the train pipe and driving the triple valves to release position in the ordinary way of releasing brakes in automatic systems. In addition to this, the groove 46 connects the main reservoir port 38 with the auxiliary brake pipe port 45, thus also permitting air to flow from the main reservoir into the pipe 15 and into the engine brake cylinders 5, and also into the pipe 20ᵃ on top of the piston 25 of valve 20, thus seating the disk valve 24 against the lower seat 22 and closing the engine triple valve exhaust port. It will be understood that the normal position of the valve 29 is with the triple exhaust port open to the atmosphere. The closure of the triple valve exhaust port could of course be secured by properly manipulating the auxiliary valve 29, but the valve 20 acts automatically to effect this function by the mere operation of the engineer's valve so that the engineer need manipulate only a single valve. In this position of the engineer's valve, therefore, the engine brakes will be held while the train brakes are being released. As soon as the train brakes have been fully released, or the engine brakes held a sufficient length of time, the engineer's valve will be brought to running position, wherein the connection between ports 38 and 45 is cut off. The air from the brake cylinders cannot flow backwardly to the engineer's valve, being stopped by the check valve 17, but the air in the pipe 15 between said check valve and engineer's valve leaks out slowly through the small leak port 21, thus permitting the spring 26 to raise the valve 24 and open the engine triple valve exhaust port to the atmosphere through the auxiliary control valve 29. It will be understood, of course, that the engine triple valve was driven to release position at the same time as the car triple valves, so that as soon as the valve 20 opens the engine brakes are released.

It will be apparent from the foregoing that whenever the brakes of the train are to be released, the handle of the engineer's valve is brought to release position, to connect the main reservoir to the engine brake cylinders and close the triple valve exhaust port of the engine, thus permitting the engine brakes to be held, while the train brakes are releasing. Consequently the train will bunch up onto the engine, and the difficulty of pulling apart the train which occurs with old brake valves is overcome. Furthermore, in descending long grades, when it becomes necessary to recharge the auxiliary reservoirs, it is simply necessary to bring the handle of the engineer's brake valve to full release position. The action is as above described. All of the triple valves are driven to release position, enabling the auxiliary reservoirs to be recharged, while the engine brakes receive air directly from the main reservoir. This holds the train until the auxiliary reservoirs are fully charged, when the brakes can again be set in the ordinary way.

Should for any reason the engineer wish to come to a stop by using his engine brakes alone, he can do this by moving the handle from running position to full release position, the effect of which is to connect the main reservoir to the engine brake cylinders. In this manner the train can be stopped by use of the engine brakes alone, which is of great advantage in case, for instance, a considerable number of the train brakes are not in proper working condition. By means of the engineer's valve alone, therefore, and by the ordinary movements or positions of such valve, the engineer is given a control over his train which is not possible with old forms of brake valves. The auxiliary valve 29 is not necessary for these operations, but is of value in case it is desired to release the engine brakes without releasing the train brakes, which can be done by merely turning said valve to connect pipe 30 to atmosphere. This auxiliary valve can also be used to close the triple valve exhaust port in case valve 20 is out of order.

What I claim is:—

1. In an automatic air brake system, the combination of a main reservoir, train pipe, brake cylinder, auxiliary reservoir, triple valve and engineer's valve connected in the usual way, connections from the engineer's valve to the brake cylinder, ports in the engineer's valve arranged to connect a source of fluid pressure to the brake cylinder, a valve actuated by the pressure in the brake cylinder for simultaneously closing the triple valve exhaust port, and an auxiliary control valve arranged to release the brake cylinder pressure.

2. In an automatic air brake system, the combination of a main reservoir, train pipe, brake cylinder, auxiliary reservoir, triple valve and engineer's valve connected in the usual way, connections from the engineer's valve to the brake cylinder, ports in the engineer's valve arranged to connect the main reservoir to the brake cylinder, and an auxiliary control valve connected to the brake cylinder, to the triple valve exhaust port, and to the atmosphere.

3. In an automatic air brake system, the combination of a main reservoir, a single train pipe, brake cylinder, auxiliary reservoir, triple valve and engineer's valve connected in the usual way, a communication between the brake cylinder and a source of fluid pressure, said communication being controlled by the engineer's valve, a valve actuated from said source of fluid pressure for closing the triple valve exhaust port, and an auxiliary hand valve for also controlling the triple valve exhaust port.

4. In an automatic air brake system, the combination of a main reservoir, train pipe, brake cylinder, auxiliary reservoir, triple valve and engineer's valve connected in the usual way, an auxiliary pipe connecting the engineer's valve and brake cylinder, passages in the engineer's valve for connecting said pipe to a source of fluid pressure, and a valve actuated by fluid pressure in said pipe for closing the triple valve exhaust port, and a leak port being provided in the piping between said exhaust valve and the engineer's valve.

5. In an automatic air brake system, the combination of a main reservoir, train pipe, brake cylinder, auxiliary reservoir, triple valve and engineer's valve connected in the usual way, a pipe connecting the engineer's valve and brake cylinder, passages in the engineer's valve arranged to connect said pipe to a source of fluid pressure, a check valve in said pipe seating toward the engineer's valve, a valve for controlling the exhaust port of the triple valve, and fluid pressure connections between said valve and the auxiliary brake cylinder pipe connected to the latter between the check valve and the engineer's valve.

6. In an automatic air brake system, the combination of a main reservoir, train pipe, brake cylinder, auxiliary reservoir, triple valve and engineer's valve connected in the usual way, an auxiliary pipe connecting the engineer's valve and brake cylinder, passages in the engineer's valve arranged to connect said pipe to a source of fluid pressure, a check valve in said pipe seating toward the engineer's valve, a valve for controlling the triple valve exhaust port, and fluid pressure connections between said valve and the auxiliary brake cylinder pipe, said connections being provided with a leak port.

7. In an automatic air brake system, the combination of a train pipe, brake cylinder, auxiliary reservoir and triple valve connected in the usual way, a main reservoir, and valve mechanism operating from a single handle and arranged to connect the train pipe to the atmosphere in one position, and in another position to connect the main reservoir to the train pipe and also to the brake cylinder, and simultaneously effect the closing of the triple valve exhaust port.

In testimony whereof, I have hereunto set my hand.

FRANK H. DUKESMITH.

Witnesses:
WILLIAM B. WHARTON,
WM. P. LARKIN.

Copies of this patent may be obtained for five cents each, by addressing the "Commissioner of Patents, Washington, D. C."